Jan. 23, 1951 J. I. BELLAMY ET AL 2,538,818

ELECTROMAGNETIC COUNTING DEVICE

Filed Aug. 7, 19 4 Sheets-Sheet 1

INVENTORS:
JOHN I. BELLAMY
RICHARD P. ARTHUR

BY [signature]

ATTORNEY

Jan. 23, 1951 J. I. BELLAMY ET AL 2,538,818

ELECTROMAGNETIC COUNTING DEVICE

Filed Aug. 7, 1948 4 Sheets-Sheet 2

INVENTORS:
JOHN I. BELLAMY
RICHARD P. ARTHUR
BY C. A. Soper
ATTORNEY

ELECTROMAGNETIC COUNTING DEVICE

Filed Aug. 7, 1948 4 Sheets-Sheet 3

INVENTORS:
JOHN I. BELLAMY
RICHARD P. ARTHUR
BY [signature]
ATTORNEY

ELECTROMAGNETIC COUNTING DEVICE

INVENTORS:
JOHN I. BELLAMY
RICHARD P. ARTHUR
BY C. P. Soper
ATTORNEY

Patented Jan. 23, 1951

2,538,818

UNITED STATES PATENT OFFICE 2,538,818

ELECTROMAGNETIC COUNTING DEVICE

John I. Bellamy, Antioch, and Richard P. Arthur, Des Plaines, Ill., assignors to Kellogg Switchboard and Supply Company, Chicago, Ill., a corporation of Illinois Application August 7, 1948, Serial No. 43,136

12 Claims. (Cl. 177—353)

This invention relates to electromagnetic counting devices. Its general object is to provide an improved structural form for an electromagnetic device for counting the number of impulses in a received series and for controlling contact sets in accordance therewith.

This invention is in the nature of a further improvement on the counting device disclosed in (1) my Patent No. 2,441,001 issued May 4, 1948, (2) in my Patent No. 2,487,015, issued November 1, 1949, and (3) in my application Serial No. 711,111, filed November 20, 1946.

A specific object is to provide a new and improved counting device including a single-step first armature and a series of succeeding two-step armatures each requiring two operational steps to move from its normal retracted position to its operated position. In such a device, any two-step armature which is in its normal position when an impulse is received is held in that position by a magnetic force exceeding that tending to move it toward operated position, and any armature preceding the last, on being moved into operated position on the receipt of its corresponding impulse of the series, effectively applies a force to the next succeeding armature which, at the cessation of the current impulse, will move it to an intermediate first-step position from which the next succeeding impulse of the series is effective to move it into operated position.

Four embodiments are disclosed which differ as to the specific arrangement for controlling the retention of the armatures in normal position, and in matters of structure and adjustment.

Features of the invention include the following:

1. The armatures, while edge-actuated, are of bell-crank form to provide a more efficient magnetic structure.

2. In one embodiment, the enhanced attraction between the respective actuating tail portions of the armatures and the underlying portion of the return plate serves as a major hold-back force to retain the armatures in their normal position and to assist in preventing their premature operation.

3. A simplified pair of combs of armature-control springs which cooperate with the armatures and with the front-yoke design to control the counting sequence.

4. A simplified adjustable mounting arrangement adapting the device to be mounted upon a common magnetic return member along with similar devices, relays, and other apparatus.

5. An improved and readily adjustable assembly of switching contact members.

Other features of the invention will appear as the description progresses.

Of the drawings, Figs. 1 to 16 show the construction of one embodiment of the improved counting device; Figs. 17 to 20 show the device modified with respect to the armatures and armature-bearing assembly; Figs. 21 and 22 show the device of Figs. 17 to 20 modified with respect to the positioning of the residual plate; and Fig. 23 shows the device of Figs. 1 to 16 modified with respect to the principal magnetic pole, the residual member and the auxiliary magnetic pole.

More in particular, Figs. 1, 2, and 3 are respectively a top view, a front view, and a left-side view of a row of the improved counting devices, with certain parts omitted, mounted along a common return plate.

Figs. 7 to 11, and their respective auxiliary views, show the parts making up a control-spring subassembly.

Figs. 12 to 15, and their respective auxiliary views, show certain of the parts included within a contact bank subassembly.

Figures 16, 16A:
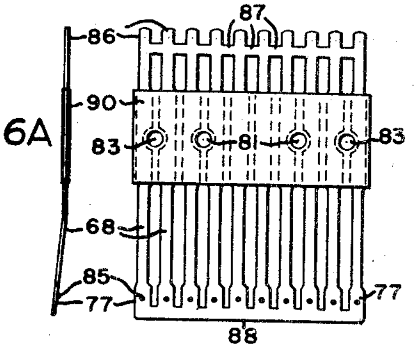

Figs. 16 and 16A show the final grid form of a partly formed fixed contact strip of the contact bank.

Figs. 17 to 20 show the structure of Figs. 1 to 17 modified, with respect to the armatures and armature-retaining member, to form the second embodiment.

Figure 21:
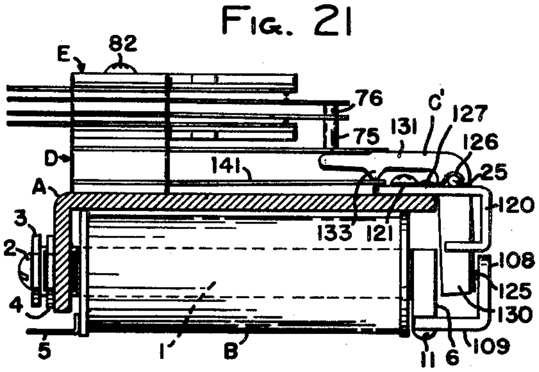
Figures 22, 22A:
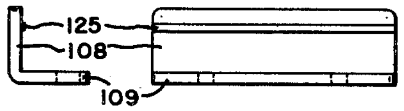

Figs. 21 and 22 show the structure of the second embodiment (Figs. 17 to 20) modified, with respect to the residual member, to constitute the third embodiment.

Figure 23:
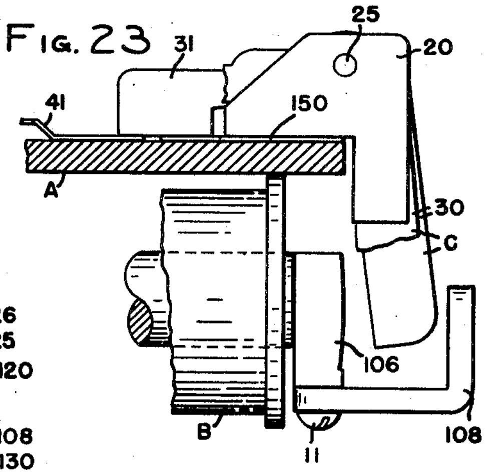

Fig. 23 shows an enlarged partial side view of the magnetic structure of the first embodiment modified to constitute the fourth embodiment.

DETAILED DESCRIPTION

A. *General arrangement*

In the first embodiment, shown in Figs. 1 to 16, magnetic angle bar A serves as a common support, and as a common magnetic-return member, for electromagnetic impulse counters mounted thereon in a row.

Referring particularly to Figs. 1 to 4, each counter includes two parallel electromagnets B yoked at their front pole ends by tractive pole member 6; an angular auxiliary restraining pole member 8 secured to the tractive pole member 6 and angularly offset therefrom; its ten armatures C with the tractive portion 30 thereof controllably disposed between poles 6 and 8; a switch bank E including ten similar upper sets and ten similar lower sets of contact members, each of the corresponding upper and lower sets being simultaneously actuable in proper sequence by the electromagnets through their respective armatures; and the portion of bar A supporting these parts.

Figure 1:
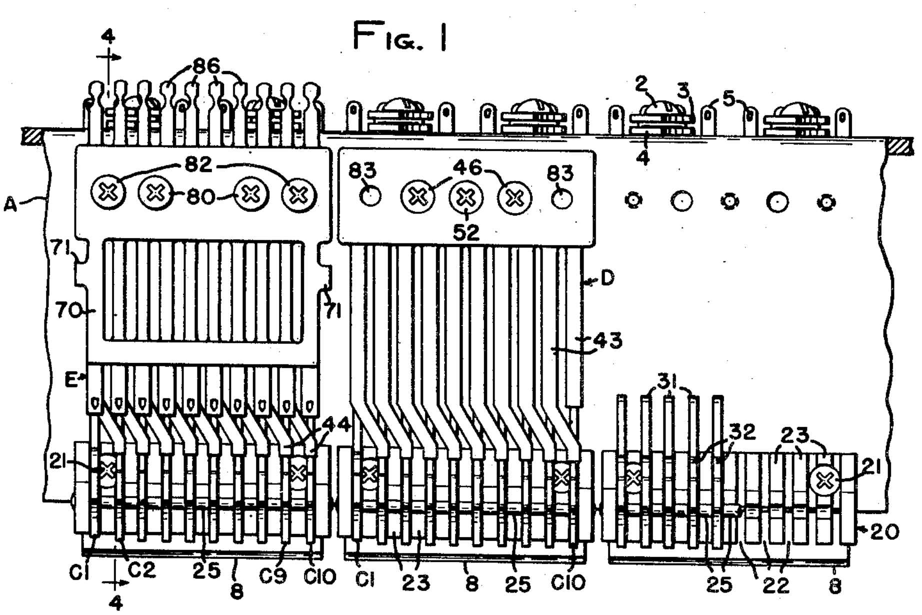

For descriptive purpose, the ensuing description will relate to one individual counter, the left-hand counter of Fig. 1, for example, keeping in mind, however, that the counters are similar and that common bar A serves as a common support and magnetic return path for a row of such counters and other desired apparatus, such as relays and the like.

Figure 3:
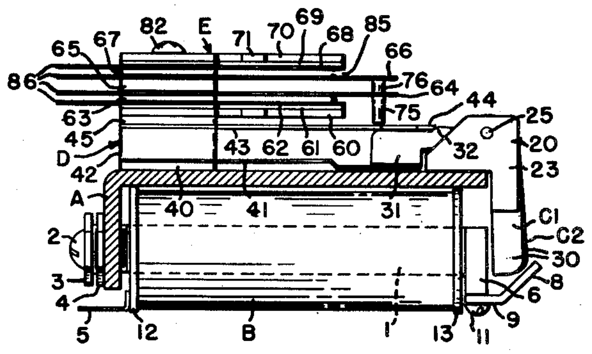
Figure 4:
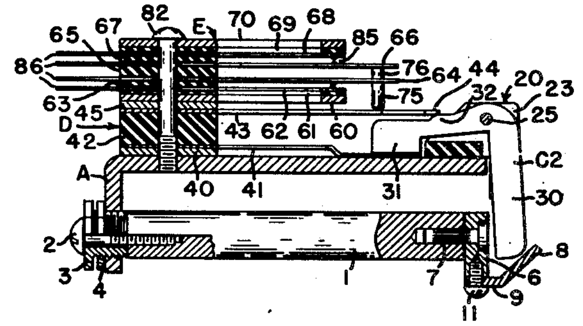
Fig. 4 is a cross-sectional view showing the second armature taken along lines 4—4 of Fig. 1.

As shown best in Figs. 3 and 4, each of the electromagnets B includes a cylindrical core 1 which is of magnetically-hard material, a rear spoolhead 12, a front spoolhead 13, and a pair of concentric windings (not separately shown) wound between the spoolheads. Each of the rear spoolheads is provided with four winding terminals 5 (one such terminal being shown in Fig. 3) with a separate pair of such terminals for each of the two windings of the associated electromagnet.

As shown in Figs. 3 and 4, each of the electromagnets B is adjustably secured to bar A by a screw 2 passing through an associated collar 3 and threaded into the rear portion of core 1. Each collar 3 is threaded through the rear flange of bar A to abut the rear end of its respective core 1. The rotation of either collar 3 in one direction, with screw 2 and lock nut 4 loosened, advances its core 1 to a desired longitudinal position where it may be secured by tightening its screw 2. Lock nut 4, when tightened, holds collar 3 in position. The rotation of either collar 3 in the opposite direction permits core 1 to be retracted by its screw 2. Thus, each electromagnet is longitudinally adjustable to align the front face of tractive pole member 6, fixed to the front pole ends of the pair of electromagnets, with the plane of the front face of bar A.

B. *The tractive pole member*

Figure 2:
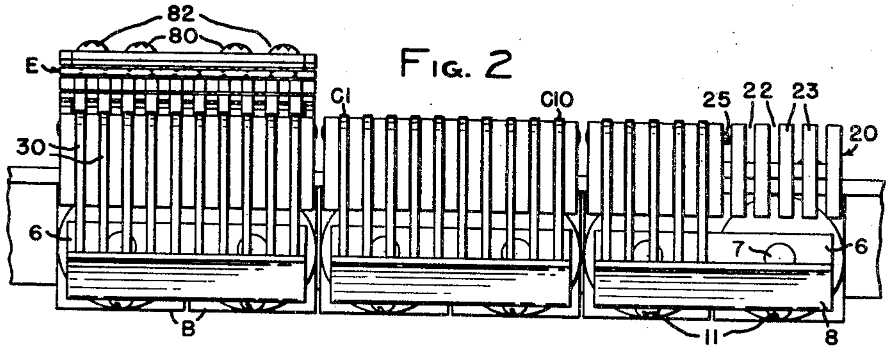

Tractive pole member 6 is the principal magnetic pole to which the armatures C, when in their intermediate position, are attracted into engagement upon the energization of electromagnets B. As shown in Figs. 2 to 4, it is in the form of a rectangular plate fixed to the pair of cores 1 by a knurled pin 7 pressed into each core, the heads of which are countersunk in the pole.

By aligning the face of pole 6 with the front face of bar A, each operated armature C strikes the bar squarely at the same time that it strikes the pole face.

Pole 6 serves as a support for the auxiliary restraining pole member 8 which will now be descriped.

C. *The auxiliary restraining pole member*

The auxiliary restraining pole member 8 is the auxiliary magnetic pole of the front magnetic structure and presents to any normally-positioned armature, except the first, a restraining force which is opposed to the attractive force of the tractive pole 6 to prevent the premature operation of such armatures. As shown in Figs. 2 to 4, pole 8 is of angular shape with leg 9 thereof secured to the under surface of pole 6 by means of two screws 11 which pass through slots at either end of such leg. The slots in leg 9 through which screws 11 pass permit a horizontal positioning of pole 8 to increase or decrease the gap between such pole and the outer edges armatures C.

D. *The armature-bearing subassembly*

An armature-bearing subassembly, comprising ten armatures C pivotally supported along common pivot pin 25 in their respective slots 22 in armature-bearing member 20, is next secured to bar A by two screws 21 which pass downwardly through slightly enlarged openings in member 20 and are threaded into bar A. The enlarged openings through which screws 21 pass, permit a horizontal positioning of member 20 to provide that the armatures C of the assembly simultaneously strike bar A and tractive pole 6 which are aligned in the same plane. Certain portions of the raised parts 23 adjacent to the ends of member 20 are cut away to permit access to screws 21 and to permit the completed subassembly to be assembled as a unit which is advantageous where a common mounting member (bar A) is employed for several pieces of closely-mounted apparatus.

The subassembly is assembled by placing the armatures C in their respective slots 22 and passing common pivot pin 25 endwise through openings in the end parts 23, through the intermediate parts 23 which are grooved for this purpose, and through the provided openings in the armatures adjacent to their fulcrum point where such pivot pin 25 may be retained in position by riveting or other suitable means. With the armatures C pivotally secured in their respective slots 22 of armature-bearing member 20, the parts 23 of such member serve as guides for the armatures and prevent their side-to-side deviation.

E. *The armatures*

The ten armatures C are referred to individually as armatures C1 to C10. They are punch-pressed from sheet material of the desired thickness and are of the illustrated bell-crank form. The armatures are edge-operated and, with the exception of the single-step first armature, require two operational steps for movement to operated position from normal position.

Each armature C, aside from the previously-described pivot-pin opening, includes a tractive arm 30 and an actuating arm portion 31. A portion 32 of the upper edge of arm portion 31, adjacent to the fulcrum, extends upwardly therefrom and in a completed assembly such portion of armatures C2 to C10 is engaged by the offset tip 44 of the preceding upper motor-control springs 43 to retract such armatures to their normally-retracted position.

Armature C1 is normally positioned, as shown in Fig. 3, by the lifting action of its underlying motor-control spring 41. It is termed a single-step armature in that but a single operational step is required to move it from its normal position into operated position. The single step required is the energization of electromagnets B, in response to the first impulse received, whereby the inner edge of tractive arm 30 of the armature is attracted forwardly into engagement with tractive pole 6. The normal position of armature C1 is advanced, with respect to that of the succeeding armatures C2 to C10, with the tractive arm 30 thereof closer to tractive pole 6 than to the auxiliary pole 8. Such a normal position of armature C1 enables it to move forwardly into engagement with the closer pole 6 in response to the first-received impulse. The completed operation of any armature C raises its actuating arm portion 31 to actuate its respective overlying contact members.

Armatures C2 to C10 are normally in a retracted position as shown for armature C2 in Fig. 4. They are termed two-step armatures in that two operational steps are required to move them from normal position to operated position. The normal position of armatures C2 to C10 is one in which the outer edge of tractive arms 30 thereof is closer to auxiliary pole 8 than the inner edge is to tractive pole 6. The actuating arm portions 31 of such armatures, in normal position, are nearly flush with the upper surface of bar A and are separated therefrom by the thickness of the associated underlying lower motor-control spring 41.

Each of the normally positioned armatures C2 to C10 is held in that position, during the period of a received impulse, by two restraining forces which exceed the operating force exerted by tractive pole 6 and the subordinate operating force exerted through the front face of bar A. The aforesaid two restraining forces exerted against such armatures are the restraining force exerted by auxiliary restraining pole 8 against the rear edge of their tractive arms 30 and the hold-back force exerted by the upper face of bar A against the under surface of their actuating arms 31.

The first operational step of any armature C2 to C10 to advance any such armature to its first-step position occurs only during an interval between impulses (when the magneto-motive force of bar A and auxiliary restraining pole 8 subsides) and when its raised portion 32 is no longer held down by the offset tip 44 of the motor-control spring 43 of the preceding armature which occurs only consequent to the operation thereof.

The intermediate or first-step position of any armature C2 to C10 is the same position as shown for armature C1 (normally so positioned) in Fig. 3 and is controllably advanced to such position in its proper sequence by the associated motor-control springs of the motor-control-spring subassembly D, the construction and assembly of which will now be described.

F. *The motor-control-spring subassembly*

Figure 6:
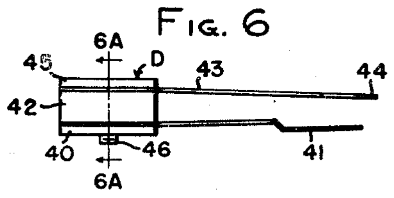
Figs. 6 and 6A are respectively a left side view of the armature-control-spring arrangement subassembly of Fig. 3 and a cross-sectional view thereof taken along lines 6A—6A of Fig. 6.
Figure 6A:
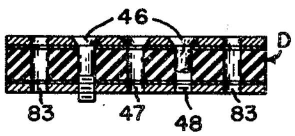

The separately assembled motor-control-spring subassembly D, shown in Figs. 6 and 6A, is next secured to bar A by a screw 52 passing through a central clearance opening 47 (Fig. 6A) therein and threaded into the bar. Assembly D may be readily assembled on bar A, with the armature-bearing subassembly in place, by uplifting armatures C to permit the lower motor-control springs 41 to be inserted thereunder. During such assembly, the resilient upper motor springs 43 may be distorted sufficiently to permit such springs 43 to assume their respective positions overlying armatures C.

The principal functions of assembly D, through its upper and lower motor springs 43 and 41, are (1) to normally position armature C1 for its operation in response to the first received impulse, (2) to advance armatures C2 to C10 in proper sequence to their intermediate first-step positions from which they may be operated in response to their corresponding impulse of the received series, and (3) by the action of the upper motor control springs 43, to retract armatures C2 to C10 to their normally retracted position and in conjunction with associated contact springs to return all operated armatures C to their respective normal position after the device has been cleared out (demagnetized).

Subassembly D includes a comb-like strip 50 of upper motor-control springs 43 and a comb-like strip 51 of lower motor-control springs 41 properly positioned by spacer 42, all clamped together between upper and lower clamp plates 45 and 40 by two screws 46 countersunk in upper clamp plate 45 and passing through clearance holes 48 in intervening parts 43, 42, and 41, and threaded into lower clamp plate 40. Clamp screws 46 protrude through lower plate 40 into provided openings in bar A to assist in retaining assembly D in assembled alignment.

Referring now to Figs. 7 to 11 and their respective auxiliary views, the individual parts making up a separately assembled motor-control-spring subassembly D will be described.

Figures 7, 7A:
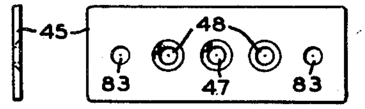
Figures 11, 11A:
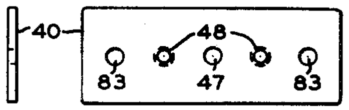

Figs. 7 and 11 show respectively, the upper clamp plate 45 and the lower clamp plate 40, which are of similar rectangular form. They serve, as shown in Figs. 6 and 6A, to clamp the parts making up assembly D into a unitary subassembly. Clamp plates 45 and 40 and the intervening parts 43, 42, and 41 making assembly D are provided with two clearance openings 83 to permit the passage of attachment screws 82 which pass therethrough and through similar openings 83 in the overlying contact bank assembly E to secure both such assemblies D and E to bar A in final assembly.

Figures 8, 8A:
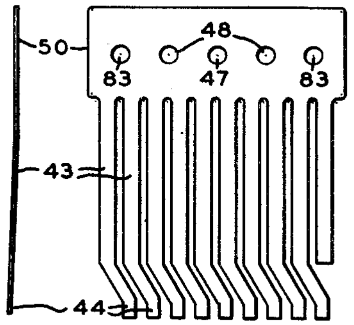

Figs. 8 and 8A show the comb-like upper motor control strip 50. Strip 50 includes a back portion which, in assembly, is secured within the clamping zone of assembly D, and ten forwardly-extending downwardly-tensioned upper motor-control springs 43. Each of the first nine springs 43 has a laterally offset tip portion 44 to engage the raised portion 32 of the succeeding armature. The last spring 43 does not have such an offset tip 44 as there is no succeeding armature for it to engage.

Strip 50 may be punched from a relatively thick sheet of spring material to provide sufficient spring tension to the motor-control springs 43 thereof which are downwardly tensioned by a preforming operation.

As shown in assembled position in Fig. 1, the intermediate portion of each upper motor-control spring 43 overlies the rear portion of the upper adge of the actuating tail portion 31 of its own respective armature C and the offset tip 44 of each of the first nine springs 43 overlies the raised portion 32 of the succeeding armature.

Each of the first nine upper motor-control springs 43 is sufficiently tensioned downwardly to overcome the lifting action of two lower motor-control springs 41, that of its own armature and that of the succeeding armature. The tenth spring 43 is not properly employed as a spring and is used mainly to keep the operational level of the tenth armature on the same plane as the other nine armatures.

Figures 9, 9A:
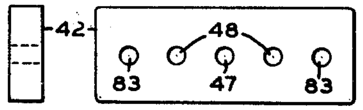

Figs. 9 and 9A show spacer 42 to be of generally rectangular shape. Spacer 42 is of a thickness which, in assembly, properly positions springs 43 of the overlying strip 50 and springs 41 of the underlying strip 51 with respect to the upper and lower edges respectively of actuating tail portions 31 of armatures C.

Figures 10, 10A:
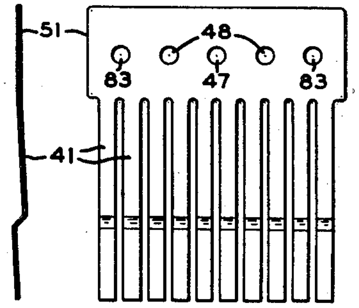

Figs. 10 and 10A show the comb-like lower motor-control strip 51. Strip 51 includes a back portion which, in assembly, is secured within the clamping zone of assembly D, and ten forwardly-extending upwardly-tensioned lower motor-control springs 41. Each of the springs 41 is upwardly tensioned to provide a lifting action for its own armatures and downwardly offset at the front to permit such offset portion to be flush with the upper surface of return member A where it serves as a residual plate for its respective armature.

Strip 51 may be punched out of a relatively thin sheet of non-magnetic spring material and spring members 41 thereof preformed to be downwardly offset as shown, and upwardly tensioned to provide the desired lifting action in assembly against the overlying lower edge of actuating arm portions 31 of their respective armatures C.

After the motor control assembly D has been secured to bar A and prior to the assembly of switch bank E, a testing load greater than that of bank E is applied and the structure is tested to determine that the armatures C are operating properly and in sequence. Because of the accurate preforming and tensioning of the upper and lower motor-control springs 43 and 41, no adjustment other than to determine that the parts are in alignment is usually necessary.

G. *The contact bank*

The contact bank E may be next assembled in its position overlying motor-control assembly D and secured to bar A by two screws 82 extending downwardly through clearance openings 83 in assembly E and through similar openings 83 in assembly D and threaded into the bar.

Referring now to Figs. 5 and 12 to 15 and their associated auxiliary views, this bank assembly is arranged to be held together as a preassembled unit by two screws 80 which pass through clearance openings 81 in the upper back-stop plate 70, and through similar openings 81 in the intervening parts thereof, and are threaded into the lower back-stop plate 60. The intervening parts include an upper tier of ten relatively fixed contact blades 68 insulated from plate 70 by insulator 69 and a tier of ten flexible traveling blades 66 insulated from blades 68 by insulator 67 and associated therewith to form a row of ten similar normally open front contact sets; a tier of ten lower relatively fixed contact blades 62 and a tier of ten flexible traveling contract blades 64 associated therewith to form a row of ten similar normally closed back contact sets, with the said contact blades 64 and 62 insulated from each other by insulator 63, and with the lower fixed contact blades 62 of said sets insulated from the lower back-stop plate 60 by insulating plate 61; and a relatively thick insulating spacing member 65 insulating contact blades 64 and 66 from each other and of a thickness to insure proper spacing between such blades.

Figures 12, 12A:
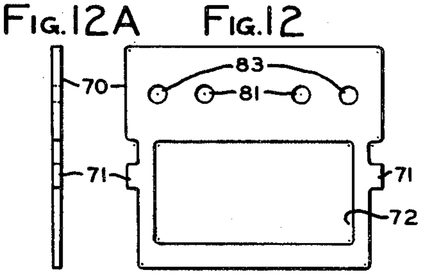

Figs. 12 and 12A show the generally squared outline form of upper back-stop plate 70. Plate 70 includes a rear portion which, as indicated, serves as an upper clamp plate for the assembly. A forward portion 72 of plate 70 is cut away to form a "window" through which access may be had in assembly to the underlying contact blades for inspection and adjustment purpose. The front portion of plate 70 serves as an adjustable back-stop to position the upwardly-tensioned upper fixed contact blades 68 and to effectively impart a desired rigidity thereto to enable them to withstand the upward pressure exerted against them by their associated operated traveling spring blades 66. Applicant's use of back-stop plates 70 and 60 imparts the desired rigidity to the fixed contact blades 68 and 62 respectively associated therewith, which in other devices is usually obtained by employing relatively thick blades. By the provision of the back-stop plates, applicant's fixed contact blades may be constructed of the same relatively thin material as the traveling contact blades, thus permitting all the contact blades to be formed of the same material. Plate 70 includes two laterally extending side portions 71, one on either side of the plate, which may be manipulated by means of a suitable forked tool to raise or lower the front portion of the plate to provide a readily accessible adjustment means for vertically positioning the upper fixed contact blades 68, tensioned against such front portion of the plate.

Figures 13, 13A:
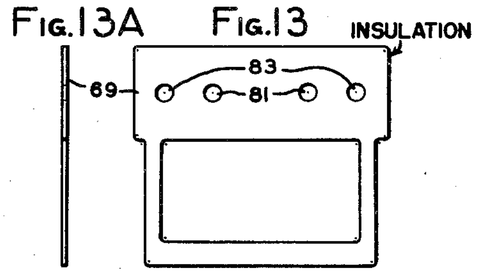

Figs. 13 and 13A show upper insulation plate 69 to be of the same general configuration as upper back-stop plate 70, which, in assembly, insulates the upper fixed contact blades 68 from back-stop plate 70.

Figures 14, 14A:
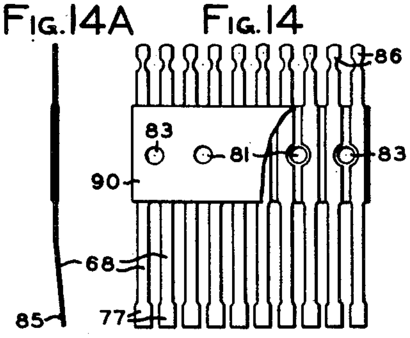

Figs. 14 and 14A show the general form of the ten upper fixed contact blades 68. Blades 68 are relatively short, upwardly tensioned, and include terminal portions 86 at the rear and contact bearing portions 77 at the front with contact points 85 affixed to the underside thereof. As shown, blades 68 are retained in a preassembled strip by retaining tape 90 affixed to the upper and lower sides of the portion of the blades retained in the clamping zone of the assembly.

The upper strip of contact blades 68 is first punched from a suitable sheet of spring material to the grid form shown in Figs. 16 and 16A. While in such grid form, contact points 85 are readily affixed to contact bearing portions 77 of each blade and the retaining tape 90 is affixed in position. Then, by a simple stamping and shearing operation, the interconnecting portions 87 of the grid are punched out to form separated terminal portions 86, the interconnecting front strip 88 of the grid is severed to form the individual contact blades 68, and the retaining tape 90 is punched out to provide clearance holes 81 and 83 therein. Retaining tape 90 is sufficient to hold the ten contact blades 68 aligned in strip-like formation and permits the strip to be handled as a unit.

All of the other contact blades of assembly E are similarly formed into their respective grid forms, one such grid for blades 66, one for blades 64, and one for blades 62, which are converted to their final tape-retained strip form by a process similar to that employed for blades 68. The retention of the contact blades in their respective strips permits their assembly as a unit.

Figures 15, 15A:
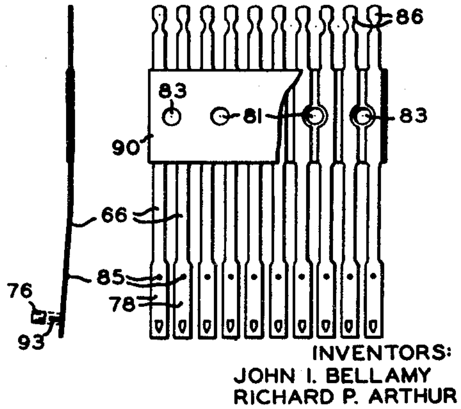

Figs. 15 and 15A show the general form of the upper strip of ten traveling contact blades 66, which in the assembly are associated with fixed contact blades 68 to form a row of ten similar normally-open front contact sets. Contact blades 66 and 68 in assembly are insulated from each other by a common insulating member 67. Traveling contact blades 66 are relatively thin and flexible with terminal portions 86 at the rear of each blade. They are pretensioned downwardly by a preforming operation to provide an adequate predetermined gap (gap width essentially determined by length of associated studs 76) between the contacts 85 affixed to the upper surface of the front contact bearing portion 78 thereof and the associated overlying contacts 85 of fixed contact blades 68 in the assembled normally open position of such contact blades 66 and 68.

Contact blades 66 are of a length that, in a completely assembled device, the forward portions 78 thereof extend forwardly from the switch bank assembly proper into a position overlying the rear actuating arm portions 31 of their respective armatures C.

Fig. 15A shows how a stud 76 is attached to its contact blade 66. Each such blade 66 has a depending tongue 93 struck downwardly therefrom. Each stud 76 has a hole vertically therethrough of a diameter slightly less than the width of tongue 93. When any such tongue 93 is forced onto its stud 76, the resulting distortion of the insulating material (such as a suitable plastic or hard rubber) of the stud causes the parts to remain firmly in position as illustrated.

Figure 5:
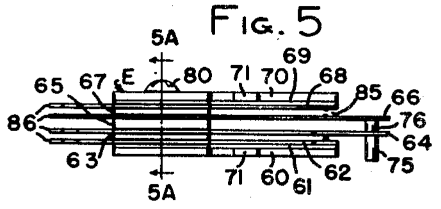
Figs. 5 and 5A are respectively a left side view of the switch bank subassembly of Fig. 3 and a cross-sectional view thereof taken along lines 5A—5A of Fig. 5.
Figure 5A:
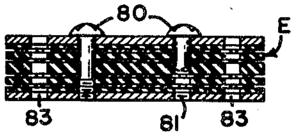

An insulating spacer 65, of the form shown in cross-sectional and side view in Figs. 5 and 5A, insulates blades 66 from the underlying upper traveling blades 64 of the lower normally closed back contact sets.

The row of ten normally closed back contact sets include an upper strip of ten traveling contact blades 64 and a lower strip of ten fixed contact blades 62 insulated from each other by an insulating member 63. Traveling blades 64 are similar in form and construction to the previously described traveling blades 66 and are similarly downwardly tensioned, but are provided with contacts on the underside to cooperate with the associated underlying contacts of their associated fixed contact blades 62. A stud 75 similar to stud 76, but longer, is attached to each traveling blade 64 in a manner as previously described for attaching studs 76 to blades 66. Overlying depending studs 76 (affixed with blades 66) and underlying depending studs 75 (affixed with blades 64) are so positioned that in final assembly, the operation of their respective armatures C raises the actuating arm portions 31 of such armatures, which thereby raises the associated upper motor-control spring 43 to raise the related studs 76 and 75 to simultaneously raise springs 66 and 64 affixed respectively thereto into operated position. Lower fixed contact blades 62 are similar to the previously described upper fixed contact blades 68 but are downwardly tensioned against their associated lower back-stop plate 60 with their contacts 85 affixed to their upper sides. Lower back-stop plate 60 is similar in form to upper back-stop plate 70 and functions with respect to its associated contact blades 62 in the same manner as previously described for upper back-stop 70 for contact blades 66 associated therewith. An insulating plate 61, of the same outline form as insulating plate 69, insulates blades 62 from back-stop plate 60.

H. *Final adjustment steps*

After the device is finally assembled on the common bar A, only two simple adjustments are required, one to vertically position the upper fixed contact blades 68 to provide for adequate contact pressure between such blades and traveling contact blades 66 when the respective armatures C thereof are fully operated, and the second, to vertically position the lower fixed contact blades 62 to provide that the combined downwardly-extending spring load of traveling blades 66 and 64 normally is exerted solely against their respective fixed contact blades 62.

The first adjustment, that of insuring adequate contact pressure between contact blades 68 and 66, when the associated armatures C are fully operated, is accomplished as follows: A thickness gauge is inserted between armatures C and tractive pole member 6 and armature C1 is advanced to engaging relationship with such gauge. By a suitable forked tool, the left offset side portion 71 of the upper back-stop plate 70 is manipulated to raise or lower the front portion of such plate 70 to vertically position the first fixed blade 68 to just make contact with its respective traveling blade 66 at this gauged point of armature advance. A similar adjustment is then made for the last fixed blade 68 by manipulating the right offset side portion 71.

By so regulating each end of the plate 70 to properly adjust the first and last normally open front contact sets, the sets intermediate thereof are also similarly and evenly adjusted to the same armature operating level by the intermediate front end portion of the plate.

The thickness gauge used is of a thickness corresponding to the amount of armature overtravel, following engagement of the normally open (upper) contact sets (blades 68 and 66), necessary to provide the desired final contact pressure for such normally open contact sets.

The second adjustment comprises positioning the lower back-stop plate 60 vertically to such a position that any control stud 75 is first engaged at the desired point in armature travel, early in the final step of the armature. As in the first adjustment, first one end of the back-stop plate, and then the other end, is manipulated through accessible tabs 71 thereof to properly position the first and last contact sets, and consequently the intermediate ones.

The proper vertical position for back-stop plate 60 is one in which there is a slight, but visible, clearance between any lower stud 75 and its underlying motor-control spring 43. In such an adjustment position, the proper functioning of springs 43 is not interfered with, and each fixed blade 62, its contacts and the contacts of the traveling blade 64 associated therewith, bears the combined spring load of its own traveling blade 64 and that of the superposed traveling blade 66 of the overlying front contact set, through the medium of its stud 76. Then, adequate contact pressure is insured in each normally-closed back contact set in the row, and ample travel of blades 64 and 66 is insured.

After the device has been finally assembled and adjusted to its illustrated normal position, it is ready to perform its counting function of which the end result is to successively operate armatures C in accordance with a series of received impulses to operate the respective pairs of contact sets associated therewith.

I. *The counting operation*

It will be noted that electromagnets B are connected magnetically in parallel between common return plate A and tractive pole member 6. The impulse windings of these two magnets are intended to be so interconnected (in series for example) that the arrival of an impulse to be counted results in the energizations of both electromagnets B in the same sense whereby they both present the same polarity of magnetomotive force to the front magnetic structure.

With the device of Figs. 1 to 16 in its illustrated normal position, the impulses of a series received by the impulse windings of electromagnets B are counted as will now be described. Each impulse magnetizes the structure to cause each armature to be attracted by flux emanating from front pole member 6, and returning through common magnetic support member A.

I1. *First impulse begins*

On the receipt by the impulse windings of electromagnets B of the first magnetizing impulse of a series, each armature C is subjected to an operating force and to a restraining force. The operating force is the combined attraction exerted by pole 6 and the front face of bar A on the tractive arm 30 of any armatures C across the operating gap and the return gap between such parts. The restraining force is principally the downward force exerted between the lower face of arm 31 and return bar A, assisted by the backward force exerted between armature portion 30 and auxiliary pole member 8. For each armature C2 to C10 in normal position, the considerable reluctance of the return gap between part 30 and the front edge of return bar A forces a considerable part of the return flux to pass rearwardly through portion 31 to the top face of return bar A, giving rise to the noted principal restraining force.

With armatures C2 to C10 in normal fully retracted position, the restraining force for each exceeds the operating force, wherefore each such armature C2 to C10 remains in normal position during the first impulse. Armatures C1, however, being normally nearer to operating pole member 6 than the others, receives a stronger operating force. Additionally, it receives a weaker restraining force due to its normally advanced position, because (1) the normal return gap (between its part 30 and the front edge of part A) is less and the gap between its part 31 and bar A is greater, and (2) it is further from auxiliary pole member 8. Accordingly, armature C1 operates promptly in response to the first impulse, engaging pole 6 and the front face of bar A.

When armature C1 has completed only a portion of its stroke, its actuating arm 31 raises its overlying upper motor-control spring 43 into engagement with the associated lower stud 75. Upon completing a further portion of its stroke, it lifts studs 75 and 76. This lifts traveling blade 64 from engagement with its underlying fixed blade 62, thereby opening the back contact represented by those two blades.

Just before armature C1 completes its stroke, the movement of stud 76 forces the overlying traveling blade 66 upwardly into engagement with its overlying fixed contact blade 68, thereby closing the front contacts represented by blades 66 and 68. Further movement results in flexing of blade 66 incident to the building up of contact pressure between the contacts of blades 66 and 68, the previously noted overtravel movement.

Upon the completion of its stroke, armature C1 has raised its overlying upper motor-control spring 43 sufficiently to remove the offset tip 44 thereof out of the operating path of the next succeeding armature C2, to thereby permit such armature to be advanced to its first-step position by its associated lower motor-control spring 41 on the termination of the impulse.

I1a. *First impulse ends*

When the first impulse through the windings of electromagnets B ends, the magnetomotive force drops to zero except for residual force and flux, arising largely from the noted magnetic hardness of cores 1. Armature C1 is held in its fully-operated position (against the combined restoring force of its upper motor-control spring 43 and its associated traveling contact blades 64 and 66) by the noted residual flux, which is relatively great because the magnetic path through an operated armature is of low-reluctance since the air gaps between the parts comprising its holding path are substantially zero in length.

When the magnetomotive force subsides at the end of the first impulse, armatures C2 to C10 are thereby released from the restraining force of the magnetic structure. Armatures C2 to C10, being unoperated, are practically not affected by the residual magnetism retained in the structure, because of the gap lengths involved.

Upon being released from the magnetic restraining force as noted, armature C2 moves forwardly in execution of its first step, and comes to rest in its intermediate position upon re-engaging the tip portion of the upper motor-control spring 43 lifted by the operated first armature C1. This first-step movement of armature C2 is induced by the light lifting force of its underlying lower motor-control spring 41.

Armatures C3 to C10, while magnetically released during the interval between pulses, are each prevented from advancing from its normal position by the offset tip 44 of the motor-control spring 43 of the preceding armature.

I2. *Second impulse begins*

At the beginning of the second impulse of the series, the previously operated armature C1 is attracted still more firmly into engagement with tractive pole 6, and armatures C3 to C10 are held from operating in response to the second received impulse by the previously noted restraining magnetic force for each.

Armature C2, having been advanced to its first-step position during the interval between the first and second impulses, promptly operates fully as previously described for armatures C1. It shifts its overlying contact parts to alternate position, and raises its own upper motor-control spring 43 to permit the next succeeding armature C3 to operate in its turn.

I2a. *Second impulse ends*

When the second impulse of the instant series ends, armatures C1 and C2 are held in fully-operated position by the residual magnetism retained in cores 1, and armatures C3 to C10 are released from the restraining force of the magnetic structure. Armatures C4 to C10 are prevented from advancing from their normal position by the tips 44 of the upper motor-control springs 43 of armatures C3 to C9.

Armature C3, having been released from the retarding force of the upper motor-control spring 43 of operated armature C2, is now advanced by its underlying lower motor-control spring 41 to its first step position preparatory to operation in response to its pertaining impulse.

I3. *Succeeding impulses*

As the succeeding impulses of the series arrive, the armatures C corresponding to any such impulse operates as previously described to shift its contact parts to alternate position and to raise its upper motor-control spring preparatory to the advance of the next succeeding armature to its first-step position when such impulse ends. The counting operation is thereby continued as described. The device is capable of counting the impulses of a series equal in number to the number of armatures C, ten being provided in the illustrated example.

14. *Clearing out*

When the operated device is to be cleared out, the electromagnets B are given a mild reversed magnetization (as by current through the previously noted second winding of each) to neutralize the residual magnetism of the structure. The operated armatures C thereupon restore by virtue of the stored downwardly exerted tension in the operated ones of the contact sets, assisted by the comparatively light restoring tension of upper motor-control springs 43.

*Second embodiment*

Referring now particularly to Figs. 17 to 20, the second embodiment of the improved counting device will be described.

In general operating principle and structure, the second embodiment of the device is similar to the first.

The principal functional difference between the structure of the first and second embodiments is that the enhanced hold-back force utilized in the first embodiment, between the actuating armature arms 31 and bar A to retain the armatures C in normal position and as a restraining force to prevent their premature operation, is not employed in the device illustrated in the second embodiment. The attraction existing between the actuating arms 131 of armatures C' and the underlying portions of bar A is reduced to a minimum in the structure of the second embodiment and is ineffectual to interfere with the operation of armatures C' thereof. The attractive force between armatures C' and bar A is reduced to a minimum in the second embodiment by employing armatures C' having undercut actuating arms 131 and by increasing the gap length between such arms 131 and bar A. The increased gap length between arms 131 and bar A is obtained in the structure of the second embodiment by employing relatively straight lower motor control springs 141 which underlie actuating arms 131 and whose front portions overlie the rear horizontal portion of armature bearing member 120 which forms a back-stop position for such springs 131 in their retarded position to separate them from bar A by the thickness of such horizontal portion of member 120.

A principal structural difference between the devices of the first and second embodiments resides in the employment in the structure of the latter of a thicker auxiliary restraining pole 108 than the one employed in the structure of the first embodiment and one which extends upwardly to overlap a substantial portion of the tractive arms 130 of armatures C' of the modified structure. The increased thickness of auxiliary restraining pole 108 provides a path of lower reluctance to the operating flux of the electromagnets B, and the overlapping of pole 108 over actuating arms 130 increases the cross-sectional area of the restraining gap between such arms 130 and restraining pole 108 to provide for a potentially greater flux passage therebetween to thereby increase the restraining force exerted by restraining pole 108 on arms 130 on energization of electromagnets B, which compensates for the loss in the second embodiment of the hold-back force between actuating arms 131 and bar A which was utilized in the first embodiment as a major armature restraining force.

The modified parts of the structure of the second embodiment which replace similar parts of the device of the first embodiment will now be described. For convenience, the modified parts of the second embodiment are assigned the reference numerals relating to similar parts in the first embodiment with one hundred added thereto. The modified armatures of the second embodiment are assigned the reference character C'.

Figure 17:
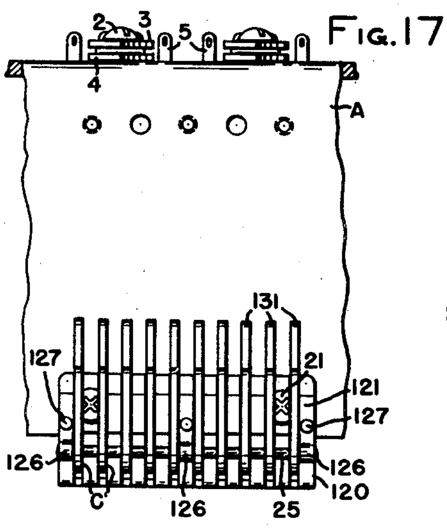
Figure 18:
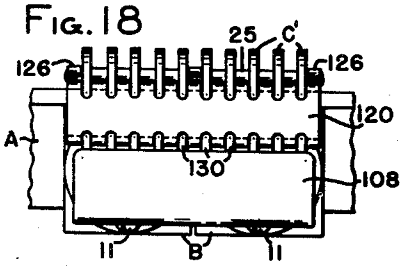
Figure 19:
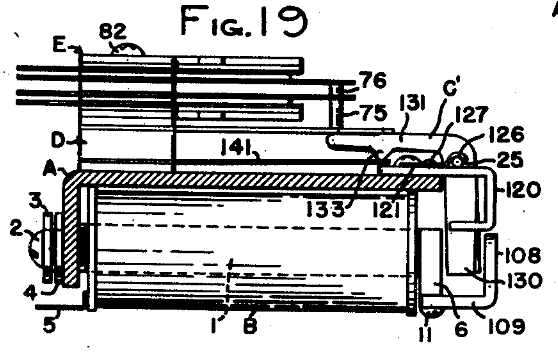
Figure 20A:
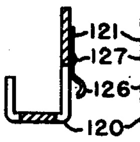
Figure 20:
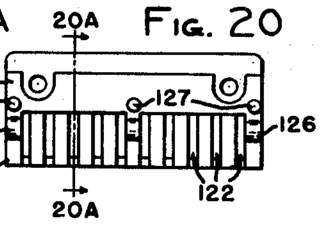

Figs. 17 to 19 show respectively a top, front, and left-side view of the modified structure of one of the improved counting devices, and Figs. 20 and 20A show a top view of a modified armature-bearing member 120 and a cross-sectional view thereof taken along lines 20A—20A of Fig. 20.

Figs. 17 to 19 show the modified auxiliary restraining pole 108 to be of L-shaped configuration which is constructed of suitable relatively thick sheet material. The vertical arm of the auxiliary restraining pole member 108 overlaps a considerable portion of the tractive arms 130 of armatures C' and is generally parallel to such armatures, with the exception of the first, when such armatures are in their normal fully-retracted position. The auxiliary pole member 108 is adjustably secured to the under surface of the principal tractive pole 6 by means of two screws 11 which pass through slots at either end of the horizontal arm 109 and are threaded into the underside of the tractive pole 6. The adjustable mounting arrangement of pole 8 permits an adjustment of the length of the air gap between the inner face thereof and the outer edges of the tractive arms 130 of armatures C' to regulate the exerted restraining magnetomotive force of such restraining pole 108 against the fully retracted tractive arms 130 during the period when electromagnets B are energized in response to a received impulse. Potentially more flux passes from the restraining pole 108 to the tractive arms 130 in the structure of the second embodiment than in the similar parts of the magnetic structure of the first embodiment, consequently the range of adjustment of the amount of restraining force exerted against the tractive arms 130 of armatures C' is extended in the modified structure of the second embodiment.

Figs. 20 and 20A show armature-bearing member 120 which pivotally supports the ten armatures C' along a common pivot pin 25 in their respective slots 122 in the armature-bearing member 120. Bearing member 120 is stamped and preformed of suitable non-magnetic material to the illustrated form and is provided with a pivot pin retention plate 121 which is secured to the upper surface of member 120 by means of three rivets 127. The retention plate 121 includes three semi-circular pivot pin retention arms 126 which serve to retain the common pivot pin 25 in position. The intermediate retention arm 126 engages a depressed portion of pin 25 to retain such pin in its assembled position. The use of the illustrated pivot pin retention arms 126 is advantageous where a lowered armature fulcrum point is desired although such arms may be replaced with portions formed integrally with the armature-bearing member 121 and extending upwardly therefrom to a desired distance (with provided pivot pin clearance openings) where the armature fulcrum point is to be raised. Armature-bearing member 120 is adjustably secured to bar A by means of two screws 21 which pass through enlarged clearance openings in the member and are threaded into the bar. The enlarged openings through which screws 21 pass, permit the member to be horizontally adjusted to provide that the operated armatures assembled therewith simultaneously engage the front face of bar A and tractive pole 6. The advantage of the armature-bearing member 120 over the member 20 described in the first embodiment resides largely in its durability and economy of manufacture.

The ten armatures C′ are of the bell-crank form illustrated in Fig. 19 and each includes a tractive arm 130 controllably disposed in the notch of the front magnetic structure formed by principal tractive pole 6 and auxiliary restraining pole 108 and an actuating arm portion 131, the rear portion of which is undercut as illustrated to provide a narrow downwardly extending portion 133 which is the only portion of the arm engaged by the underlying lower motor-control spring 131.

As shown in Fig. 19 for the first lower motor-control spring 141, each of the lower motor-control springs 141 is relatively straight with the forward end thereof overlying the horizontal portion of armature-retaining member 120 which serves as a back-stop for such springs 141 in their retarded position, and serves to provide a relatively wide gap between the overlying actuating arms 131 of armatures C′ and bar A.

*Third embodiment*

Referring now particularly to Figs. 21 to 22 and auxiliary view 22A, the third embodiment of the improved counter will be described.

In general operating principle and structure, the third embodiment of the device is similar to the second. The principal difference between the structure of the second embodiment and that of the third is that in the latter a fixed residual member 125 is applied to the inner surface of the auxiliary restraining pole 108 to provide an adjustable back-stop position to regulate the stroke of armatures C′ and to prevent the tractive arms 130 thereof from "sticking" to such auxiliary restraining pole 108 during the period between impulses due to the residual magnetism retained in the pole and the armatures C′.

The residual member 125 is a relatively thin and narrow plate formed of suitable non-magnetic material which extends across and is affixed to an intermediate portion of the inner surface of the auxiliary restraining pole 108 in a position to engage the tractive arms 130 of any fully retracted armature C′. The use of the fixed residual member 125 provides a predetermined fixed residual air gap between the tractive arms 130 and the auxiliary restraining pole 108 whose residual characteristic depends upon the thickness of the residual member employed. The adjustable method of securing the auxiliary restraining pole 108 to tractive pole 6 described in the first and second embodiments (screws 11 passing through slots in the horizontal arm of the restraining pole and threaded into pole 6) permits the auxiliary pole 108 and the residual member 125 affixed thereto to be moved closer to or farther from the outer edges of the tractive arms 130 of armatures C′ to thereby provide an adjustable back-stop position for tractive arms 130 of armatures C′ to regulate the amount of the forward stroke of such armatures.

*Fourth embodiment*

Referring now particularly to the enlarged view shown in Fig. 23, the fourth embodiment of the improved counting device will be described. Fig. 23 is a partial left-side view of the structure of the fourth embodiment with certain parts of the first armature removed to show the normal position of the succeeding armature and with the curvature of the front face of tractive pole 106 exaggerated for its better illustration.

In general operating principle and structure, the fourth embodiment of the device is similar to the first.

The principal structural differences between the structure of the first and fourth embodiments are as follows: (1) a residual plate 150 is employed in the structure of the fourth embodiment to provide a residual air gap between the actuating armature arms 31 and bar A with the lower motor-control springs 41, which provided such gap in the structure of the first embodiment, being shortened sufficiently to permit the residual plate 150 to underlie the greater portion of the actuating armature arms 31; (2) a principal tractive pole member 106 having a curved front face which in the structure of the fourth embodiment replaces the front flat-faced tractive pole 6 employed in the first embodiment; and (3) the L-shaped auxiliary restraining pole 108 described in the second embodiment is employed in the front magnetic structure of the fourth embodiment.

The structure, function and adjustable mounting arrangement of the auxiliary restraining pole 108 employed in the structure of the fourth embodiment are the same as described for the corresponding similar pole 108 illustrated and described in the second embodiment. The armatures C employed in the fourth embodiment are similar in form to the armatures C in the first embodiment and may be used effectively with the L-shaped overlapping pole 108 because, as described in the second embodiment, of the extended adjustment range of the restraining force of such pole against the tractive armature arms. The residual plate 150 employed is of a thickness to provide an air gap between the actuating armature arms 31 and bar A to regulate the amount of restraining magnetic attractive force therebetween to a point well within the adjustment range of the auxiliary restraining pole 108 to provide a properly adjusted combination of restraining forces comprising the force existing between actuating arms 31 and bar A and between pole 108 and tractive arms 30.

The residual plate 150 is composed of suitable non-magnetic material of a desired thickness (approximately .010 inch has been found to be satisfactory) which lies flatly upon bar A and extends rearwardly to underlie the major portion of the actuating arms 31 of armatures C. Residual plate 150 is clamped in its position between bar A and an armature-bearing member 20. The use of residual plate 150 imparts stability to the structure and provides an accurate predetermined residual air gap between the actuating arms 31 and bar A which is uniform throughout for all the armatures and unchanging in the continued use of the device because of the stable method of securing the plate and its general structure which prevents its distortion. The employment of residual plate 150 to provide the residual air gap instead of relying upon the lower motor-control springs 41 permits such springs to be designed primarily for their mechanical function (advancing armatures C) which is advantageous where a certain balance of forces is required.

The employment of the principal tractive pole 106 having a curved face (approximately a six-inch radius) is advantageous in that all operated armatures strike tangent to the radius in a uniform line of contact which provides uniformity of lever (armature) ratio which facilitates adjustment factors. The front face of the tractive pole 106 is curved through the portion faced by the armatures with the portion therebelow of a suitable increased thickness to receive the attachment screws 11 securing the auxiliary restraining pole 108 thereto.

We claim:

1. In an electromagnetic counting device wherein the armatures of a series are operated responsive respectively to the successive impulses of a series delivered to the electromagnet of the device, means normally positioning the first armature of the series in effective tractive relationship to the electromagnet to condition it for operating in response to the first impulse of a series, restoring springs for the succeeding armatures effective respectively to restore them to a position of ineffective tractive relationship to the electromagnet, advance springs opposed respectively to said restoring springs, each advance spring being effective to advance its associated armature into effective tractive relationship to the electromagnet subject to the associated restoring spring being rendered ineffective, means responsive to the operation of any said armature preceding the last for rendering ineffective the said restoring spring of the next succeeding armature, and means so relating any armature in its said position of ineffective tractive relationship to the electromagnet as to retain it in such position during the delivery of a said impulse to the electromagnet.

2. In an electromagnetic counting device wherein the armatures of a series are operated responsive respectively to the successive impulses of a series delivered to the electromagnet of the device, means normally positioning the first armature of the series in effective tractive relationship to the electromagnet to condition it for operation in response to the first impulse of a series, restoring springs bearing on the succeeding armatures respectively to restore them to a normal position of ineffective tractive relationship to the electromagnet, means responsive to the operation of any said armature preceding the last for lifting the said restoring spring of the next succeeding armature sufficiently out of engaging relationship therewith that it is not reengaged by its said armature incidental to the subsequent advance thereof, and means so relating the electromagnet to any armature in its said normal position as to retain such armature therein during the delivery of a said impulse to the electromagnet, and means effective subject to the said lifting of its restoring spring and to the termination of the instant impulse for advancing any armature succeeding the first into a position of effective relationship to the electromagnet.

3. In an electromagnetic counting device wherein the armatures of a series are operated responsive respectively to the successive impulses of a series delivered to the electromagnet of the device, means normally positioning the first armature of the series in effective tractive relationship to the electromagnet to condition it for operating in response to the first impulse of a series, restoring springs for the succeeding armatures effective respectively to restore them to a position of ineffective tractive relationship to the electromagnet, means responsive to the operation of any said armature preceding the last for lifting the said restoring spring of the next succeeding armature out of restraining relationship therewith to a position beyond an intermediate position of effective tractive relationship of such succeeding armature with the electromagnet, the last said restoring means including a portion of the last said restoring spring overlying the armature undergoing operation, means effective to advance any said armature succeeding the first toward operated position subject to its restoring spring being lifted and to the termination of the instant impulse, the last said portion of any restoring spring overlying its preceding armature by such a distance that such armature on advancing toward operated position is stopped thereby in its said intermediate position of effective tractive relationship to the electromagnet.

4. In an electromagnetic counting device wherein fulcrumed armatures lying side by side are operated responsive respectively to the successive impulses of a series delivered to the electromagnet of the device, means for controlling said armatures in their said successive counting movement including a restoring spring normally engaging each armature succeeding the first relatively close to its fulcrum, each restoring spring also engaging the immediately preceding armature at a point further from its fulcrum part way in its operating movement, each spring having a diagonally disposed forward portion extending between the said points of armature engagement, the springs and their diagonal portions being so interrelated that all said springs may be stamped from a single sheet of material.

5. In an electromagnetic counting device wherein fulcrumed armatures lying side by side are operated responsive respectively to the successive impulses of a series delivered to the electromagnet of the device, means for controlling said armatures in their said successive counting movement including a restoring spring normally engaging each armature succeeding the first at a certain distance from its fulcrum, each restoring spring also engaging the immediately preceding armature at a substantially different distance from its fulcrum part way in its operating movement, each spring having a diagonally disposed forward portion extending between the said points of engagement, the springs and their diagonal portions being so interrelated that all said springs may be stamped from a single sheet of material.

6. In an electromagnetic counting device wherein fulcrumed armatures lying side by side are operated responsive respectively to the successive impulses of a series delivered to the electromagnet of the device, means for controlling said armatures in their said successive counting movement including a restoring spring normally engaging each armature succeeding the first at a certain distance from its fulcrum, each restoring spring being engaged by the immediately preceding armature at a substantially further distance from its fulcrum when such preceding armature has advanced part way in its operating movement further movement of said preceding armature lifting the last-named restoring spring out of engagement with its associated armature.

7. In an electromagnetic device, an electromagnet and a series of armatures pivotally mounted in operative association therewith, restoring springs respectively bearing on the armatures succeeding the first at a point comparatively near the pivot point, said springs being effective to restore such armatures respectively to a normal position comparatively remote from said electromagnet, each restoring spring having an offset portion overhanging the immediately preceding armature at a point comparatively far from its pivot point and so related thereto that such spring is engaged thereby subject to such preceding armature being in an intermediate position when the armature to which the spring pertains is in its said normal position, said restoring springs rendering said armatures operative successively each in response to the operation of the immediately preceding one, responsive to energization of said electromagnet.

8. In an electromagnetic counting device wherein the armatures of a series are operated responsive respectively to the successive impulses of a series delivered to the electromagnet of the device, means for controlling said armatures in their successive counting movement including an operating pole member and a restraining pole member for the electromagnet providing opposed pole faces between which the armatures lie in operative relationship thereto, said restraining pole member having an angularly disposed portion fixed therewith overlapping the operating pole member and adjustably secured thereto to enable the distance between the opposed pole faces to be regulated.

9. In an electromagnetic counting device wherein the armatures of a series are operated responsive respectively to the successive impulses of a series delivered to the electromagnet of the device, means for controlling said armatures in their successive counting movement including an operating pole member and a restraining pole member for the electromagnet providing opposed pole faces between which the armatures lie in operative relationship thereto, said restraining pole member having a portion disposed in overlapping relation to the operating pole member and adjustably secured thereto to enable the distance between the opposed pole faces to be regulated.

10. In an electromagnetic counting device wherein a series of intermediately pivoted armatures lying side by side are operated responsive respectively to the successive impulses of a series delivered to the electromagnet of the device, pole structures representing opposite poles respectively of the electromagnet, the armatures being disposed in operative relationship with said structure, means normally positioning each armature succeeding the first closer to the first pole structure than to the second to maintain it in a normal ineffective position with respect to the second pole structure until the impulse preceding its corresponding one has been delivered, means normally positioning the first armature of the series closer to the second pole structure than to the first to condition it for operation thereby in response to the first impulse of a series, and means responsive jointly to the operation of any armature preceding the last and to the termination of the instant impulse for moving the next succeeding armature closer to the second pole structure than to the first to condition it for operation by the second pole structure in response to the next succeeding impulse of said series.

11. In an electromagnetic device wherein the armatures of a series are operated responsive respectively to the successive impulses of a series delivered to the electromagnet of the device, means normally holding each armature succeeding the first in a retracted position of ineffective tractive relationship to the said electromagnet, a magnetic return member, back-stop positioning means providing an air gap between each said armature in its normal position and the magnetic return member, the parts being so related that any armature in its normal position is restrained therein by the tractive force of return flux traversing said air gap, means effective to advance any armature succeeding the first from its said normal position to an effective intermediate position subject to the release of the holding means with respect thereto, means effective between succeeding impulses of a series for maintaining a normal magnetization of the said electromagnet sufficient to hold any operated armature but insufficient to hold any armature in normal position after release of the holding means with respect thereto, and means including auxiliary pole means so related to the said armatures in their normal position as to afford an auxiliary restraining force which is sufficient to supplement the said return-path restraining force to hold any released armature in normal position until the end of the impulse occasioning its release.

12. In an electromagnetic device wherein the armatures of a series are operated responsive respectively to the successive impulses of a series delivered to the electromagnet of the device, means normally holding each armature succeeding the first in a retracted position of ineffective tractive relationship to the said electromagnet, an auxiliary pole member, back-stop positioning means fixed with the auxiliary pole member providing an air gap between it and each said armature in normal position, the parts being so related that any armature in its normal position is restrained therein by the tractive force of flux traversing said air gap, means effective to advance any armature succeeding the first from its said normal position to an effective intermediate position subject to the release of the holding means with respect thereto.

JOHN I. BELLAMY.
RICHARD P. ARTHUR.

REFERENCES CITED

The following references are of record in the file of this patent:

UNITED STATES PATENTS

| Number | Name | Date |
|---|---|---|
| 2,272,496 | Wood | Feb. 10, 1942 |
| 2,305,450 | Stibitz | Dec. 15, 1942 |
| 2,400,452 | Wood | May 14, 1946 |
| 2,441,001 | Bellamy | May 4, 1948 |
| 2,452,568 | Harrison | Nov. 2, 1948 |